Feb. 12, 1952     C. G. A. JOHNSON, JR     2,585,556
RECIPROCATING VALVE
Filed March 19, 1947     3 Sheets-Sheet 1
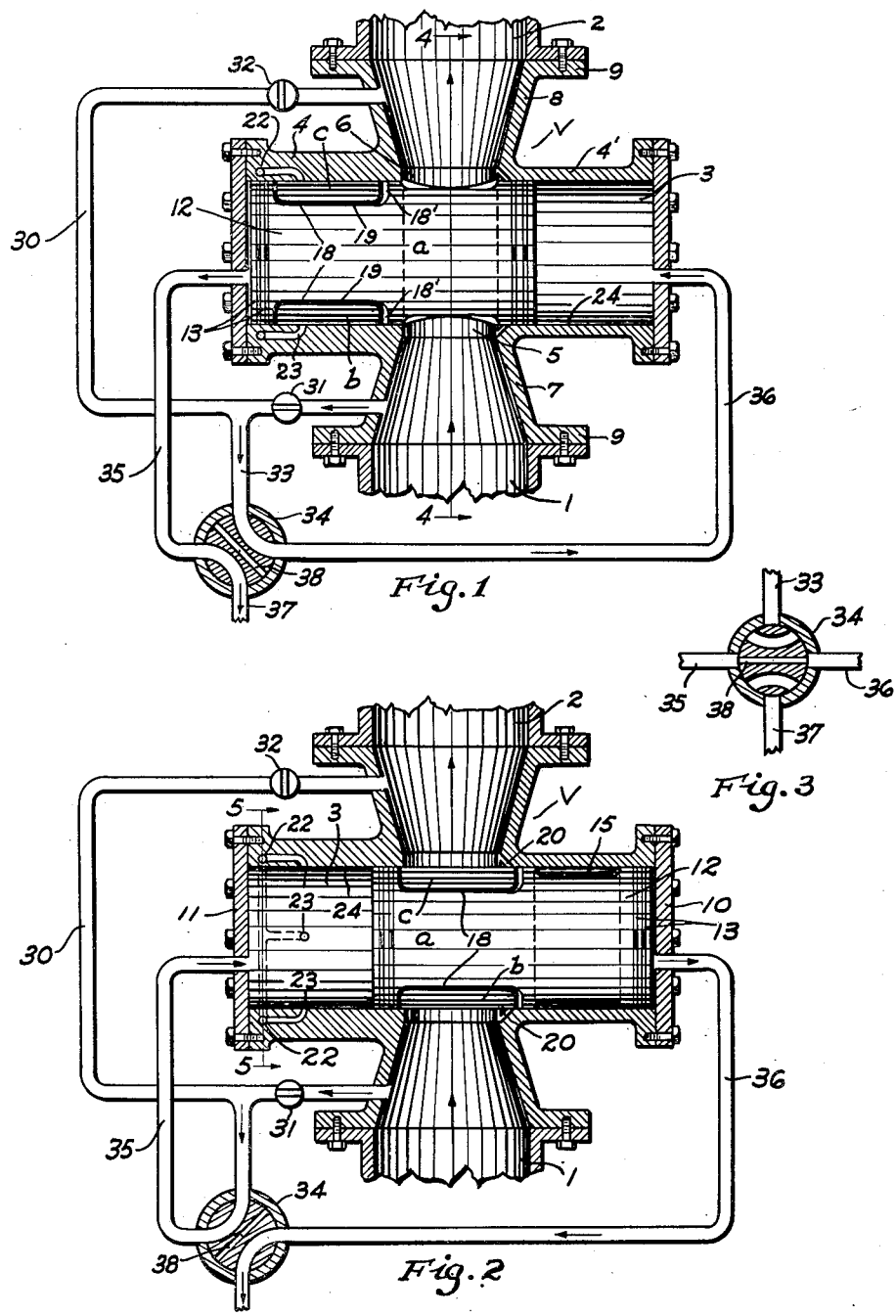
INVENTOR.
CARL G. A. JOHNSON JR.
BY Feb. 12, 1952 C. G. A. JOHNSON, JR 2,585,556
RECIPROCATING VALVE
Filed March 19, 1947 3 Sheets-Sheet 2

INVENTOR.
CARL G. A. JOHNSON JR.
BY

Feb. 12, 1952  C. G. A. JOHNSON, JR  2,585,556
RECIPROCATING VALVE
Filed March 19, 1947  3 Sheets-Sheet 3

INVENTOR.
CARL G. A. JOHNSON JR.
BY

Patented Feb. 12, 1952

2,585,556

UNITED STATES PATENT OFFICE 2,585,556

RECIPROCATING VALVE

Carl G. A. Johnson, Jr., Mansfield, Ohio, assignor to The Ohio Brass Company, Mansfield, Ohio, a corporation of New Jersey Application March 19, 1947, Serial No. 735,660

11 Claims. (Cl. 251—65)

This invention relates to valves to control the flow of fluids in pipe lines and has for one of its objects in particular the use of line pressure to operate the valve to its open and closed positions.

Another object of this invention is to provide a valve having inlet and outlet ports controlled by a reciprocating or rotary piston or rotary plug with resilient packing material to seal one or both ports when the valve is closed.

Another object of this invention is to provide the sealing means of resilient material to prevent leakage of the fluid into the valve cylinder when the valve is closed.

Another object of this invention is to provide the valve with sealing means of resilient material which will surround one or both line openings or ports when the valve is in its closed position.

Still another object of this invention is to provide means to prevent displacement of the sealing means as the valve operates from its closed to its open position.

A still further object is to provide a valve adapted to control a pipe line and having a body and means to control the inlet and outlet ports in the body, the body and control means having adjacent relatively movable surfaces and packing means of a resilient construction and associated with one of the said surfaces to seal one or both openings when the valve is closed.

A still further object of this invention is to provide a valve having a movable member to control the inlet and outlet openings therein and having means to seal said openings when the valve is closed, with means to eliminate any pressure within the valve from displacing the sealing means as the valve is operated from its closed to its open position.

Another object is to provide the valve with port sealing means which is so constructed as to maintain its position and will have improved wiping and anti-friction properties as the valve opens and closes.

A still further object of this invention is to provide means to equalize the pressure in different areas on the surface of the valve opening and closing member when the valve is in the open position.

Still another object of this invention is to provide a valve having relatively movable parts and sealing means with means to eliminate any residual pressure between the sealing means and the adjacent valve surface when the control member is in the open position.

Other objects and advantages will appear from the following description and drawings.

In the drawings:

Fig. 1 is a horizontal sectional view of the invention in the open position with a schematic arrangement of control means set to operate the valve to its open position.

Fig. 2 is a horizontal sectional view of the invention in the closed position with a schematic arrangement of control means set to operate the valve to its closed position.

Fig. 3 is a sectional or schematic view of the control valve in Figs. 1 and 2, but showing the control valve in its neutral or equalizing position.

Figure 4:
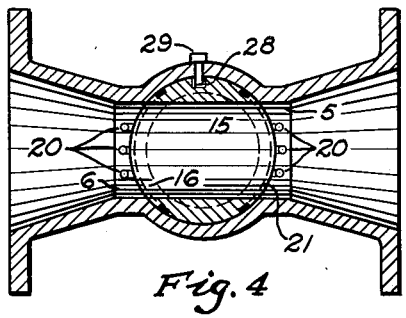
Fig. 4 is a section on the line 4—4 of Fig. 1.
Figure 5:
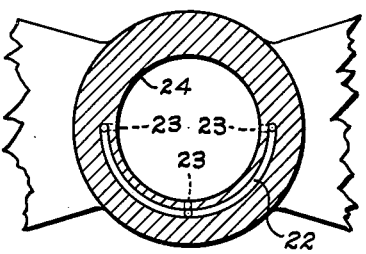
Fig. 5 is a section on the line 5—5 of Fig. 2.

In the embodiment of this invention, shown in Figs. 1 and 2 the pipe line comprises the inlet line 1 connected to the outlet line 2 by the control valve V. The inlet line 1 may be a high pressure line carrying oil, gas, gasolene or other fluids.

The valve comprises a body having a cylindrical bore 3 formed by the walls 4 and 4' with the inlet port 5 and outlet port 6 opening into the cylindrical bore. These ports may be round or square.

The body is provided with the tapering portions 7 and 8 terminating in flanges 9 to which the lines 1 and 2 may be secured. The cylindrical bore is closed at each end by the plates 10 and 11.

The control member shown in Figures 1 and 2 comprises a hollow reciprocating cylindrical member 12 having a close sliding fit to the inner surface of the walls of the bore 3. The control member is provided at each end with piston rings 13.

Figure 10:
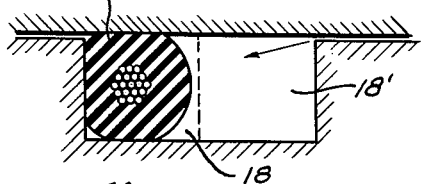
Fig. 10 is a section on the line 10—10 of Fig. 8 showing one form of resilient packing which has been found satisfactory, and its distortion when under mechanical compression and fluid pressure on one side from fluid pressure within the valve.
Figure 11:
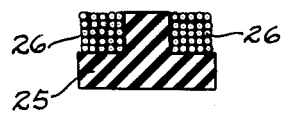
Fig. 11 is a cross section of another form of resilient packing.

The piston rings 13 may be replaced by closed rings of resilient material similar to those shown in Figs. 10 and 11, but made sufficiently elastic to be stretched and applied over the ends of the control member and into their proper grooves.

The reciprocating member or valve control member 12 is closed at each end by walls 14 or these closure walls may extend across the interior of the hollow reciprocating member at any position so long as they do not interfer with the port openings 15 and 16 in the wall of the member 12 or their registering with the ports 5 and 6 respectively in the valve body.

The interior of the reciprocating member 12 may be strengthened by a rib or ribs 17 so positioned as not to interfer with the port openings through the member 12. The ports 15 and 16 are shown as substantially square in Fig. 8 and are positioned nearer one end of the reciprocating member 12 than at the other end and register with the ports 5 and 6 when the valve is in its open position.

In valves having a movable control member and particularly large valves to control fluids under high pressures, it is very often the practice to provide one or both bearing or contacting surfaces with grooves filled with grease to not only lubricate the cooperating surfaces but to act as a packing and to prevent leakage of line fluid through the valve when the valve is closed. These grooves are so formed in the body and in the control member that as the control member moves from its closed to its open position or vice versa the grooves in the control member do not pass across the ports in the body as in that case the grease in the grooves is very apt to be blown out of the groove in the control member by the fluid pressure in the line or within the valve.

It is found that an improvement over the use of grease in grooves, is to use a packing or sealing member of resilient material such as rubber or neoprene or other material which will not be affected by the line fluid and may be reinforced as by cords or cotton or plastic material.

Such packing or sealing member must be placed in the bearing wall of either the body member or the control member but it cannot be positioned in both since there must be relative movement of these members and the packing should preferably be a closed ring surrounding one or both ports of either the body or the control member.

In the present invention grooves 18 are formed in the bearing surface of the control member 12 so positioned that when the control member is in the closed position the grooves will surround the port openings 5 and 6 and will be clear of such openings when the valve is open. This groove is preferably formed in the control member as it is more easily formed therein.

In Figs. 1, 2, 6, 7 and 8 a resilient packing or sealing member 19 as briefly described above is positioned in groove 18. In Fig. 10 the packing 19 is shown mounted in the groove 18 and shows how the sealing member may be compressed or squeezed against the bearing surface of the bore 3 and subject to fluid pressure as indicated by the arrow.

The groove 18 is made substantially the same width as the diameter of the packing 19 and somewhat shallower but along one side (Fig. 8) the groove 18 is increased in width to about double that of the diameter of the packing as shown at 18'. This extra width is along the side next to the port openings 15 and 16 in the control member 12.

Figure 6:
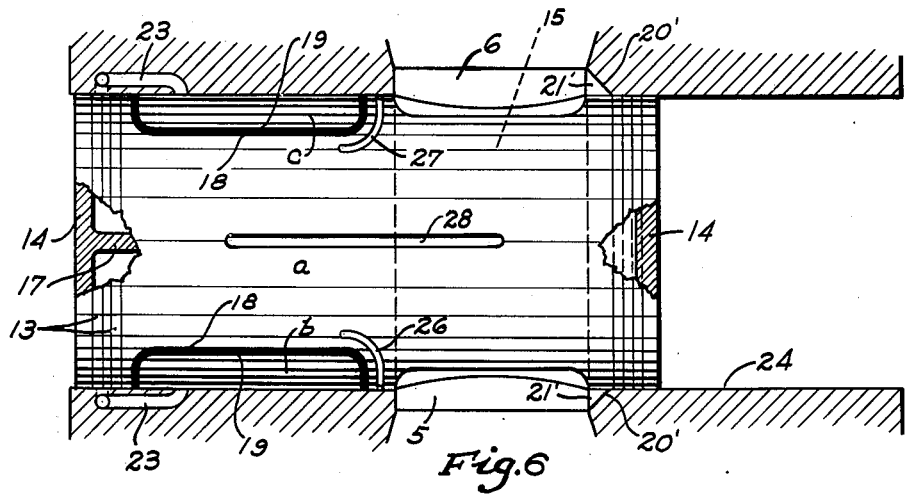
Fig. 6 is an enlarged top view of the port controlling member shown in Figs. 1 and 2 with adjacent portions of the body shown in partial section to disclose the relation of the various parts when the valve is open and shows two modifications later described.
Figure 7:
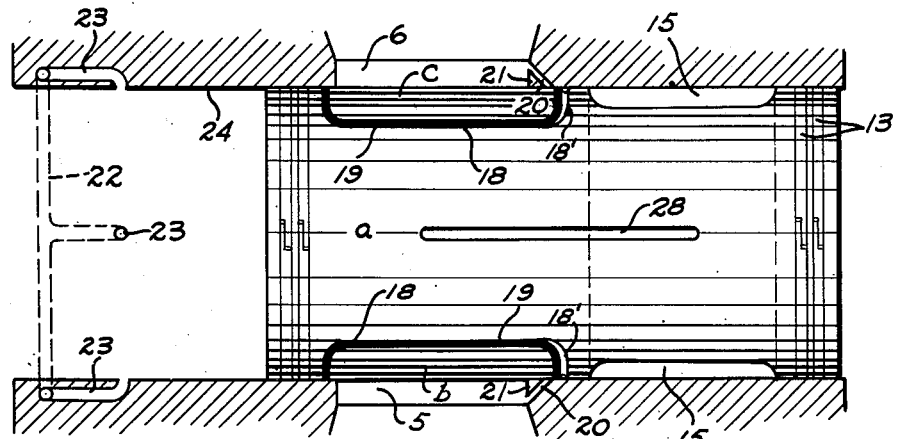
Fig. 7 is an enlarged top view of the port control member shown in Figs. 1 and 2 with adjacent portions of the body shown in section to disclose the relation of parts when the valve is closed.
Figure 9:
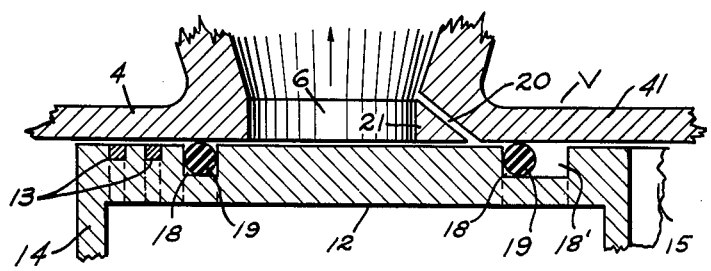
Fig. 9 is an enlarged portion of the valve body in section showing the port in a portion of the body and an enlarged portion in section of the port control member in closed relation to the port to better show the relation of certain control parts.

The body member shown in Figs. 1, 2, 7 and 9 is provided with a plurality of openings 20 extending through the lip 21 (Fig. 9) which surrounds the ports 5 and 6 but the openings 20 are placed along that side of the ports 5 and 6 nearest the groove 18—18' when the control member 12 is in its closed position as in Fig. 7. In Fig. 6 the openings 20 of Figs. 2 and 9 are shown as slots or grooves 20' along the inner surface of the lip 21'.

It is found that if the groove 18 is of uniform width then due to the possibility of a higher pressure within the valve body or bore 3 from that at the ports 5 and 6, as the control member 12 moves from its closed to its open position that this difference in pressure is very apt to raise that portion of the packing or sealing member 19 from its position in the groove 18 when such portion passes the lip 21 and becomes exposed at the ports 5 and 6.

The purpose of the extra width of the packing groove 18—18' and of the openings 20 and slots or grooves 20' is to prevent displacement of the unsupported portion of the packing ring 19 as the control member moves from its closed to its open position.

By making the groove 18 with the extra width 18' along that portion which becomes exposed in crossing the ports 5 and 6 and providing the lip 21 with the openings 20 therethrough, then when the groove portion 18' coincides with the openings 20 the pressure within the groove 18—18' will be equalized with the adjacent port pressure before the control member 12 has moved sufficiently toward its open position to expose the packing 19 to the port opening (Fig. 9).

While the displacement of the sealing ring 19 is more apt to take place at the outlet port 6, it may take place at the inlet port 5 should the pressure at the outlet port 6 be greater than that at the inlet port 5 due to operating conditions.

Means to operate the valve to its open and closed position by the use of the line pressure is shown schematically in Figs. 1 and 2.

The by-pass pipe 30 connects to the inlet and to the outlet side of the valve and is controlled by the hand valves 31 and 32. A pipe 33 connects the pipe 30 to the valve 34. A pipe 35 connects one end of the bore 3 to the valve 34 and a pipe 36 connects the other end of the bore to the valve 34 and pipe 37 goes to atmosphere. By-pass 38 in valve 34 connects pipes 35 and 36 (Fig. 3).

Assume the valve V to be closed as in Fig. 2 and it is desired to open the same as in Fig. 1, then the valve 34 will be set as in Fig. 1 and the hand valves 31 and 32 set as indicated in Fig. 1. Whereupon fluid pressure will flow as shown by the arrow into the right hand end of the valve V from the supply pipe 1 thus moving the control means 12 to its open position and in doing so whatever fluid pressure there may be in the left hand end of the valve V will be forced out to atmosphere as shown by arrows.

When the valve V is open as in Fig. 1, the valve 34 is operated to the position shown in Fig. 3 and the hand valve 31 closed. If it is desired to operate the valve V by fluid pressure from the pipe 2, then the valve 32 is opened while valve 31 remains closed. The operation is reversed if it is desired to close the valve V (see Fig. 2).

As there is a possibility of fluid pressure leaking past the piston rings 13 under the high fluid pressure under which the valves may operate, this pressure which may tend to leak into one end or the other of the bore, will be equalized through the by-pass 38 when the valve 34 is in the neutral position as shown in Fig. 3.

A close-coupled valve for performing the functions necessary to operate the valve V to its open and closed positions and forming substantially a part of the valve V is shown in U. S. Patent 2,326,398 and others are shown in U. S. Patents 2,333,205 and 2,337,841.

There are three pressure areas on the surface of the control member which are quite independent of each other, namely; area $a$ which is the main area between the end rings 13 and area $b$ which is that area enclosed by the sealing ring 19 opposite the port 5 in Fig. 2, and the area $c$ which is surrounded by the sealing ring 19 opposite the port 6 in Fig. 2.

These three areas may take on different pressures when the valve is in the closed position since the inlet port may have a very high pressure as much as 1000 pounds per square inch or higher and the outlet port very low pressure and the intervening surface area $a$ of the control member may be at some other pressure.

As the valve is operated to its open position these three areas may take on still different pressures as the ports 5 and 6 are uncovered and these different pressures over the said three areas retained as the control member moves to its fully open position.

It has been found advantageous to have the pressure in the area $a$ and the two sealed-off areas $b$ and $c$ to be equal when the valve is in its open position and this is accomplished by providing a conduit 22 at one end of the body preferably within the wall 4 and forming a part of or an entire circle with ducts 23 therefrom opening onto the surface 24 of the bore and locating the openings 23 such that they will open onto the areas $a$ and $b$ and $c$ just before the trailing end of the packing or sealing rings 19 have completely passed the ports 5 and 6 or in other words just before the areas $b$ and $c$ cease to have communication with the ports 5 and 6.

In Fig. 11 is shown a cross-section of another form of packing which has been found satisfactory. The member 25 may be of rubber, or rubber composition such as neoprene, or a plastic suitable for the service and fluid to be controlled. The corner sections are filled with members 26 of fabric such as cotton or plastic cords or cloth formed to fit the corner sections. The corner members 26 may be impregnated or not. The combination forms a resilient packing.

The control member 12 constitutes a longitudinally reciprocating piston although it may be of the well-known tapered or straight sided rotatable plug type. The area between the ports in the plug would be provided with oppositely disposed resilient packing to surround the body ports when the valve is in the closed position the same as in case of the reciprocating type, Figs. 1 and 2 then the edge of the ports and the packing grooves would be constructed as in the case of the reciprocating type valve to prevent displacement of the packing as the rotatable plug was rotated from the closed to its open position.

Figure 8:
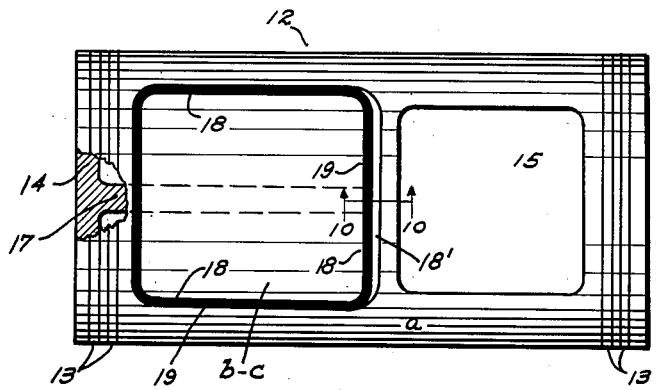
Fig. 8 is a side view in partial section of a portion of the port control member shown in Figs. 6 and 7.

In Fig. 6 is shown a modification of the control member shown in Figs. 7 and 8 in that the groove 18 and packing or sealing rings 19 are of the same width throughout and a separate groove 27 extends along and parallels the one side of the packing ring 19 and close thereto which tends to equalize the pressure adjacent the packing ring 19 when the groove 27 coincides with the openings 201 and before the packing ring 19 is exposed to the ports.

The control member is prevented from rotating relative to the body member by means of the slot 28 in the control member and the pin 29 secured in the body member and projecting into the slot.

Figure 13:
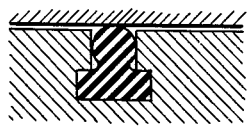
Figs. 12, 13 and 14 are modified arrangement of several forms of resilient packing and their relation to the control member as later described.
Figure 12:
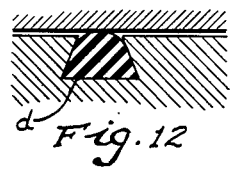

In Figs. 12 and 13, the sealing ring is shown as locked in their respective grooves by under cutting the side faces of the groove and forming the sealing ring so as to interlock with the under cut portions of the groove. The undercut may be on both or only one side face and if desired the ring may be further held in the groove by the use of an adhesive between the contacting faces as at $d$ in Fig. 12.

The packing rings being of a resilient material they may be forced into their respective grooves. The use of an adhesive is of particular advantage in case there is no interlock between the sealing ring and the sides of the groove as would be the case where the ring in Fig. 11 is used in a straight sided groove. The adhesive may be one of the various plastic cements such as made of casein or phenol-formaldehyde product, etc., which will meet requirements.

Figure 14:
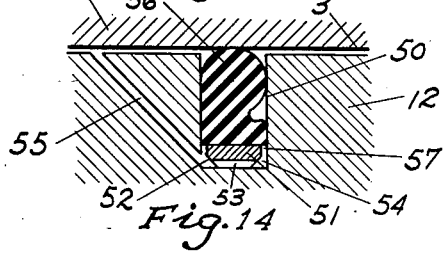

In Fig. 14 is shown a modified form of means for preventing the sealing or packing ring from being displaced when the control member moves from a closed to an open position.

In this last construction the groove 50 is formed to the required size and positioned in the bottom of the groove is a support member 51 which extends along that portion of the groove adjacent the side of the port 15 and which corresponds to that portion of the groove 18' in Fig. 8.

The member 51 is of metal and has its two edges 52 beveled and a plurality of cross grooves 53 along its length connecting the pockets 54 formed by the beveled edges 52.

A duct 55 opens into the lower portion of the groove 50 and onto the surface of the control member 12 on that side of the sealing ring adjacent the port when the valve is closed for the same purpose as the construction shown in Fig. 9 and there may be several ducts 55 positioned along the support member.

The resilient packing or sealing ring 56 may be of various shapes and rests upon the member 51 and engages the surface 3 of the control member 4'. The support member 51 may be of such width as to provide a slight space 57 between its longitudinal edges and the side walls of the groove 50.

I claim:

1. A valve comprising a body member having a bore with a cylindrical surface and with an inlet port and an outlet port, a control member having a cylindrical surface positioned in the bore and movable to two positions therein, the said cylindrical surfaces forming bearing surfaces, the control member provided with an opening therethrough registerable with the ports when the control member is in one position and the valve is open, a pair of closed grooves formed in one of the said surfaces and a closed packing ring in each groove so arranged as to resist the flow of fluid pressure from one port to the other port when the control member is in its other position and means to equalize the pressure between each groove and the adjacent port as the control member moves from its closed to its open position and means to operate the control member to either of its two positions.

2. A valve comprising a body provided with a bore and having an inlet port and an outlet port, a control member mounted in the bore and movable to one position to connect the ports and movable to another position to disconnect the ports, the control member provided with packing means positioned in a groove formed in the surface of the control member and arranged to engage the adjacent surface of the bore and enclose a portion of the surface of the control member and surround at least one port when the ports are disconnected and means positioned within the body member adjacent the edge of said one port whereby the groove and the port opening will be connected and the pressure therein equalized as the control member moves to connect the ports and before the packing means starts to cross the said one port.

3. A valve comprising a body member provided with a bore and having an inlet port and an outlet port communicating with the bore, a control member mounted in the bore and movable to one position to connect the ports and movable to another position to disconnect the ports, a sealing ring associated with the surface of the control member and arranged to engage the adjacent surface of the bore and enclose a portion of the surface of the control member and surround one of the ports when the control member is in a position to disconnect the ports and means at one end of the body member so constructed and arranged relative to the body member and the control member as to connect the said enclosed portion of the control member with that portion of the control member outside the said enclosed portion when the control member is in its position to connect the ports whereby any pressure retained in the said enclosed portion of the control member surface will be equalized with that in the unenclosed portion of the control member.

4. In a valve comprising a body provided with a bore and inlet and outlet ports and a control member positioned in the bore and movable to close or open the ports, and a pair of packing means associated with the surface of the control member and arranged to engage the adjacent surface of the bore and each packing means enclosing a separate area of the surface of the control member to close off the ports, the combination with the body of means to equalize the pressure between the said enclosed areas of the control member and the balance of the surface of the control member, the last said means comprising a conduit positioned in the wall of the body adjacent one end of the bore and provided with ducts opening onto the surface of the bore and the ducts so arranged as to inter-connect each of the said areas and the said balance of the surface of the control member adjacent the said areas to said conduit when the control member is in its open position.

5. A valve comprising a body member provided with a bore having an inlet port and an outlet port, a control member mounted in the bore and movable to one position to connect the ports and movable to another position to disconnect the ports, the control member provided with sealing means positioned in separate grooves formed in the surface of the control member and arranged to surround the ports when the control member is in its port closing position, such said groove and sealing means enclosing a portion of the surface of the control member, means associated with the body member adjacent the ports to equalize the pressure in the sealing grooves with that in the adjacent port before a portion of the grooves is exposed directly to the port and means at one end of the body member arranged to connect each enclosed portion of the surface of the control member with the other enclosed portion and with that portion of the surface of the control member not so enclosed whereby any difference in pressure in the said portions will be equalized.

6. A valve comprising a body member provided with a bore and an inlet port and an outlet port, a control member mounted in the bore and movable to one position to connect the ports and to a second position to disconnect the ports, the control member provided with packing means encircling the control member at its ends and to engage the adjacent surface of the bore, the control member provided with sealing rings positioned in separate grooves formed in the surface of the control member and arranged to engage the adjacent surface of the bore and surround the ports when the control member is in its said second position, each sealing ring enclosing a portion of the surface of the control member, means associated with the body member adjacent the ports to equalize the pressure in the sealing ring grooves with that in the adjacent port before a portion of each sealing ring is moved to a position unsupported by the wall of the bore and means at one end of the body member arranged to connect each said enclosed portion of the surface of the control member with that portion of the surface of the control member between the packing means but outside the sealing rings whereby the pressure between the said portions will be equalized when the control member is in its open position.

7. A valve as described in claim 6 characterized by having means to operate the control member to either of its positions, the said means utilizing fluid pressure from either of said ports and conducting it to either end of the bore and the operating means arranged to equalize the pressure at the ends of the bore after the control member has been operated.

8. A control member for a valve comprising a plug provided with a bearing surface and movable to either an open or to a closed position, a port extending through the plug at right angles to the longitudinal axis of the plug, a groove formed in the surface of the plug and sealing means of resilient material positioned in the groove, the port and the sealing means being so positioned relative to each other and to the plug that when the plug is in either of its positions in a valve body provided with ports the sealing means will be supported by the adjacent bearing surface of the valve body and a portion of the sealing means will be unsupported by the body as the plug moves from one position to its other position, separately formed means positioned in the bottom of the groove upon which that portion of the sealing means rests which is unsupported by the valve body as set forth above, the said separately formed means providing space between it and the bottom surface of the groove, and means connecting the said space with the surface of the plug.

9. A valve to control the flow of fluid under pressure comprising a body provided with a bore and having an inlet port and an outlet port, a control member mounted in the bore and movable to one position to disconnect the ports and movable to another position to connect the ports, the control member provided with a closed groove opening onto the surface of the control member and a sealing ring of resilient material positioned in the groove and arranged to contact with the adjacent surface of the bore and surround one of the ports when the ports are in disconnected relation, the said groove having a width substantially that of the sealing ring except that portion of the groove which crosses the port as the control member moves from one position to its other position being wider than the sealing means to receive fluid pressure, means associated with the body adjacent the port to equalize the pressure in that portion of the groove which is of extra width with that pressure of the adjacent port before the said wider portion of the groove begins to cross the port as the control member moves from either position to its other position.

10. A valve body provided with a bore and with an inlet port and an outlet port, each port opening into the bore, the port axes aligned and at right angles to the axis of the bore, each port surrounded by a lip portion where the port intersects the bore and the lip portion of at least one port provided with conduit means extending through the lip portion, the conduit means opening into the port at a point spaced from the bore and opening into the bore at a point spaced from the intersection of the port and bore, whereby the fluid pressure in the port is conducted from the port to the bore and enters the bore at the last said point.

11. A valve to control the flow of fluid under pressure comprising a body provided with a bore and having an inlet port and an outlet port, a control member mounted in the bore and movable to one position to disconnect the ports and movable to another position to connect the ports, the control member provided with a groove formed in the surface of the control member and completely surrounding a portion of the surface of the control member and the groove opening onto the surface thereof, a packing ring of resilient material positioned in the groove and arranged to contact the adjacent surface of the bore and surround one of the ports when the ports are in disconnected relation, means to equalize the fluid pressure between the groove and the said surrounded port as the control member moves from its said one position to its other position, and means to operate the control member to either of its two positions.

CARL G. A. JOHNSON, Jr.

REFERENCES CITED

The following references are of record in the file of this patent:

UNITED STATES PATENTS

| Number | Name | Date |
| --- | --- | --- |
| 1,716,896 | Miller | June 11, 1929 |
| 1,886,340 | King | Nov. 1, 1932 |
| 2,064,267 | Nixon | Dec. 15, 1936 |
| 2,070,000 | Clade | Feb. 9, 1937 |
| 2,134,277 | Sproull et al. | Oct. 25, 1938 |
| 2,194,254 | King | Mar. 19, 1940 |
| 2,314,683 | Berry | Mar. 23, 1943 |
| 2,332,282 | Volpin | Oct. 19, 1943 |
| 2,337,841 | Shafer | Dec. 28, 1943 |
| 2,461,041 | Donaldson | Feb. 8, 1949 |

FOREIGN PATENTS

| Number | Country | Date |
| --- | --- | --- |
| 4,947 | Great Britain | of 1893 |